(12) United States Patent
Hsieh (10) Patent No.: US 10,437,285 B2
(45) Date of Patent: Oct. 8, 2019

(54) MOBILE FRAME

(71) Applicant: ZENLET Co., Ltd., Taipei (TW)

(72) Inventor: Yueh-Yin Hsieh, Taipei (TW)

(73) Assignee: ZENLET CO., LTD., Taipei (TW)

( * ) Notice: Subject to any disclaimer, the term of this patent is extended or adjusted under 35 U.S.C. 154(b) by 0 days.

(21) Appl. No.: 15/712,179

(22) Filed: Sep. 22, 2017

(65) Prior Publication Data

US 2018/0081396 A1    Mar. 22, 2018

(30) Foreign Application Priority Data

Sep. 22, 2016  (TW) .............................. 105130673 A
Sep. 22, 2016  (TW) .............................. 105130674 A (51) Int. Cl.
| | | |
|---|---|---|
| *A47G 1/17* | (2006.01) | |
| *G06F 1/16* | (2006.01) | |
| *F16M 11/04* | (2006.01) | |
| *F16B 1/00* | (2006.01) | |
| *F16M 11/20* | (2006.01) | |

(52) U.S. Cl.
CPC .............. *G06F 1/1616* (2013.01); *F16B 1/00* (2013.01); *F16M 11/041* (2013.01); *F16M 11/046* (2013.01); *F16M 11/2021* (2013.01); *G06F 1/1624* (2013.01); *F16B 2001/0035* (2013.01)

(58) Field of Classification Search
CPC ........... F16B 2001/0035; E05D 15/066; A01K 63/006
See application file for complete search history.

(56) References Cited

U.S. PATENT DOCUMENTS 3,346,993 A  * 10/1967 Johnson ................ E05D 15/066
                                                              16/320
8,215,605 B1 *  7/2012 Shepley ............... A01K 63/006
                                                              224/562
2013/0178161 A1 *  7/2013 Shulenberger .......... G06F 1/162
                                                              455/41.2

* cited by examiner

*Primary Examiner* — Amy J. Sterling
(74) *Attorney, Agent, or Firm* — Muncy, Geissler, Olds & Lowe, P.C.

(57) ABSTRACT

A mobile frame includes an upper frame and a lower frame. The upper frame includes an upper outside frame and an upper inside frame. A first coupling portion, of the upper frame, includes a first continuous slot module, a second continuous slot module and a first magnetic coupling device. The lower frame includes a lower outside frame and a lower inside frame, and the lower inside frame is coupled to the lower outside frame. A second coupling portion of the lower frame includes a second magnetic coupling device. A plurality of magnetic elements are positioned between the first and the second continuous slot modules.

9 Claims, 12 Drawing Sheets

MOBILE FRAME

CROSS-REFERENCE TO RELATED APPLICATIONS

The present application is based on, and claims priority from, Taiwan Patent Application Serial Number 105130673 and 105130674, both filed on Sep. 22, 2016, the disclosure of which are hereby incorporated by reference herein in their entirety.

TECHNICAL FIELD

The present invention relates to a frame, and more particularly, a mobile frame for portable electronic devices.

BACKGROUND

Due to rapidly developing of internet and media information technologies, various kind of portable electronic devices, such as notebook computer, PDA, tablet, smart phone, or multimedia player, have been becoming important and indispensable tools in people's daily life. To improving the convenience and practicability of the portable electronic devices, many assistance or protection apparatuses are dazzlingly appeared in the market, for example a support apparatus with stand unit.

U.S. Pat. No. 5,607,054 disclosed "Folio carrying case for a notebook computer", which includes front and back panels configured to cover opposite sides of the notebook. In the closed position, the carrying case serves as a folio to protectively cover the notebook computer and, in the open position, can also serve as a computer stand supporting the notebook computer. However, this design was quite bulky and heavy, it's not easy to carry around.

Taiwan patent No. M511781 disclosed "Stand-supporting protection bag for electronic productions", which includes a bag and a cover, the bag is used for accommodating a electronic device, the cover is foldable and can serve as a stand supporting the electronic device. However, this prior art provided stand-supporting only without a handle.

In the prior arts, most of the protection apparatuses for electronic devices were appeared in forms of shell, cover or bag, with integrating molding and most of them were in from of flip cover. A flip cover type protection device doesn't offer a handle structure, user still need to place the electronic device in the backpack. In some of the prior arts, the structure of the protection device became so complicated, which can increase the assembling steps, complicate the operation, and cause high cost.

In order to solve the above mentioned issues, a mobile frame with multiple functions is needed. It will be very convenient to use a portion of the frame as a handle while walking, at the same time the handle also can be used as a hanging component. As the mobile frame been placed on a table, part of the frame can serve as a support for adjusting the height and inclined angle of a notebook computer.

SUMMARY

In this invention, a mobile frame includes an upper and lower frame is proposed. The upper frame includes an upper outer frame and upper inner frame. A first coupling portion of the upper frame includes a first continuous slot, a second continuous slot and a first magnetic coupling device. The lower frame includes a lower outer frame and a lower inner frame, and the lower inner frame is coupled to the lower outer frame. A second coupling portion of the lower frame includes a second magnetic coupling device. A plurality of magnetic elements are positioned between the first and the second continuous slot. The magnetic coupling between the second magnetic coupling device and the plurality of magnetic elements is larger than the magnetic coupling between the first magnetic coupling device and the plurality of magnetic elements.

The inner side of the upper outer frame has a mortise, the outer side of the upper outer frame has a tenon matching to the mortise. A first volume locates between the upper inner frame and the upper outer frame, a second volume locates between the lower inner frame and the lower outer frame, the first volume corresponds to the second volume.

The lower outer frame has a sliding dust-proof component, each of the upper inner frame and the lower inner frame latches with a protecting cover, respectively.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1A:
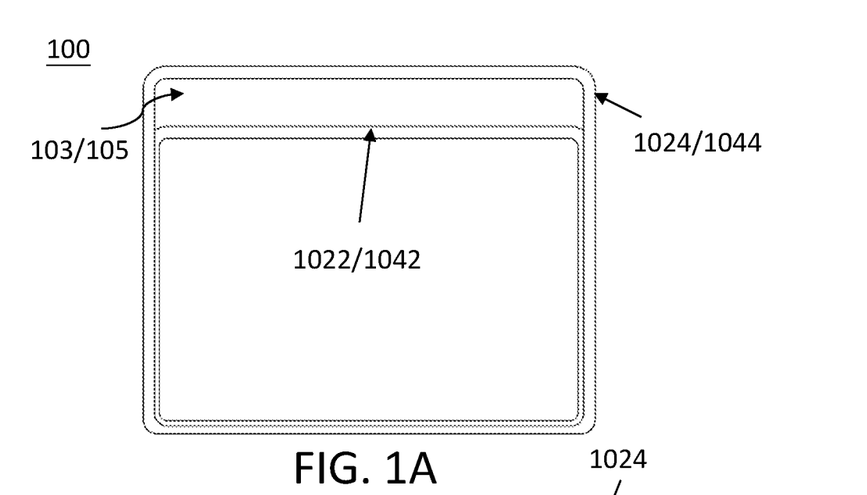
FIG. 1A illustrates an front view of a mobile frame according to an embodiment of the invention.
Figure 1B:
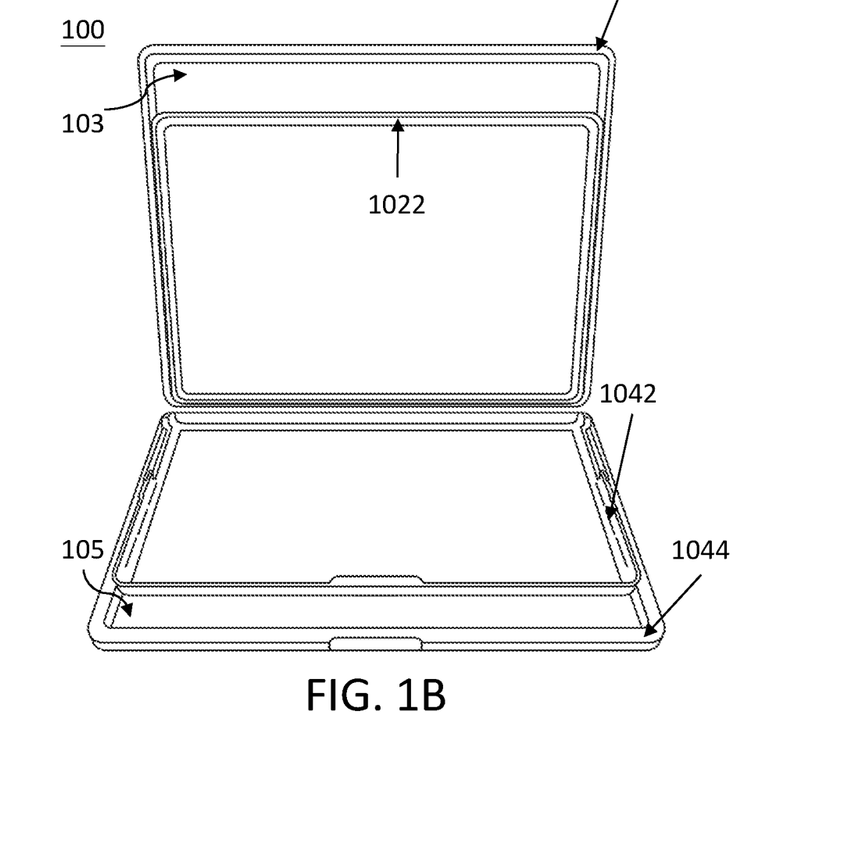
FIG. 1B illustrates a perspective view of a mobile frame according to an embodiment of the invention.
Figure 1C:
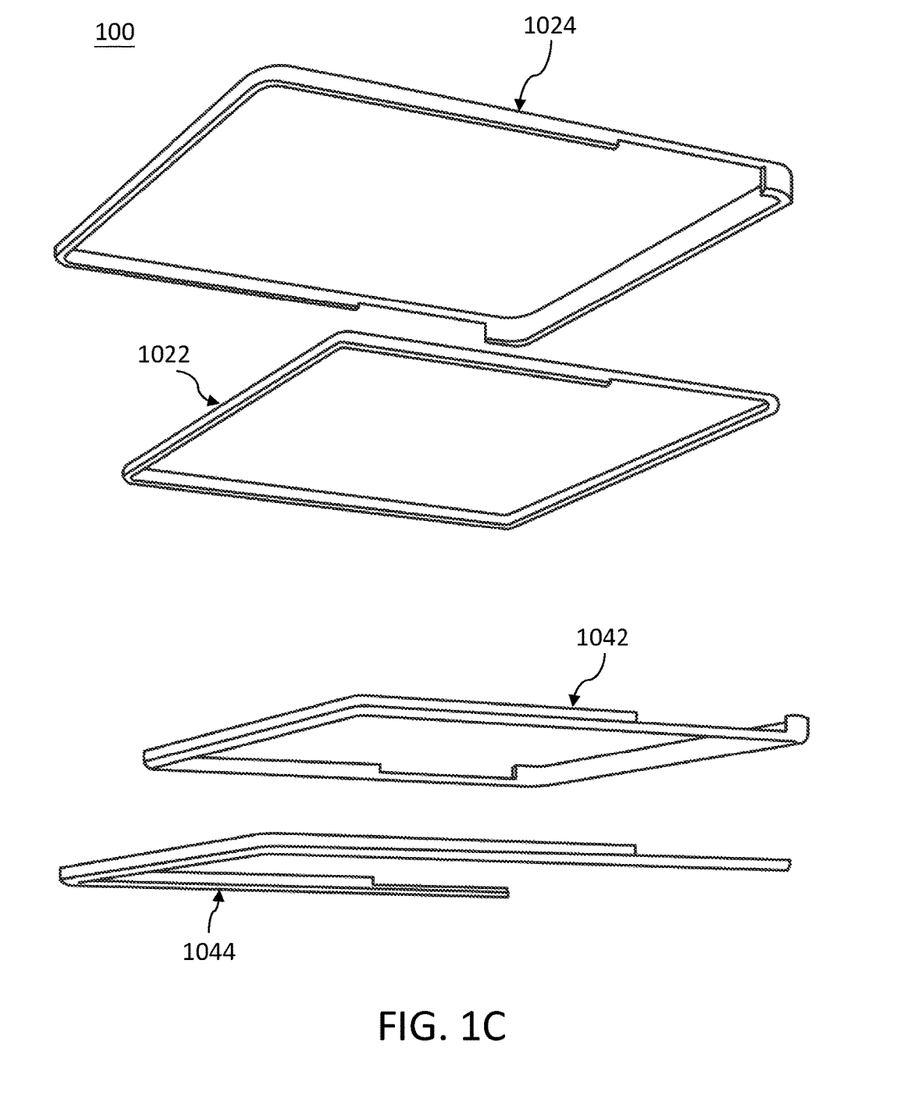
FIG. 1C illustrates an exploded view of a mobile frame according to an embodiment of the invention.

Referring to FIG. 1A-C, a mobile frame 100 (or a frame 100) includes an upper frame 102 and a lower frame 104, the upper frame 102 and the lower frame 104 can have relative movement and rotation. There may contain a pivoting unit (not shown) between the upper frame 102 and the lower frame 104, however, the pivoting unit may not be necessary here, a component with special design having multiple functions can be used to replace the pivoting unit instead. The details will be described in the following paragraph.

Figure 2A:
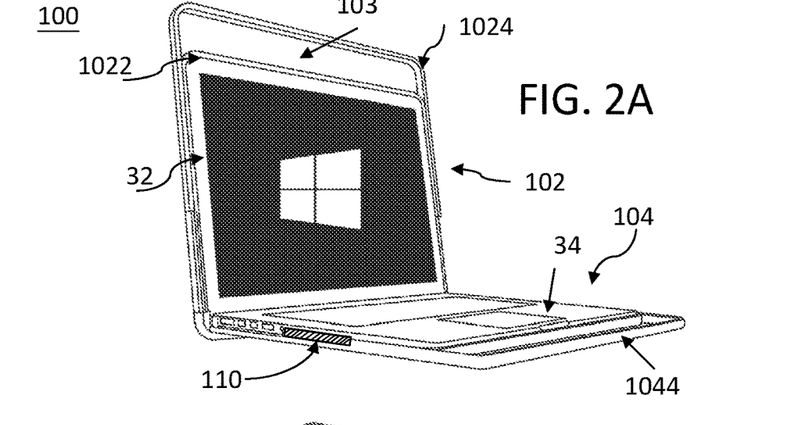
FIG. 2A illustrates a schematic view showing a mobile frame with a notebook computer in it according to one embodiment of the invention.
Figures 2B, 2C:
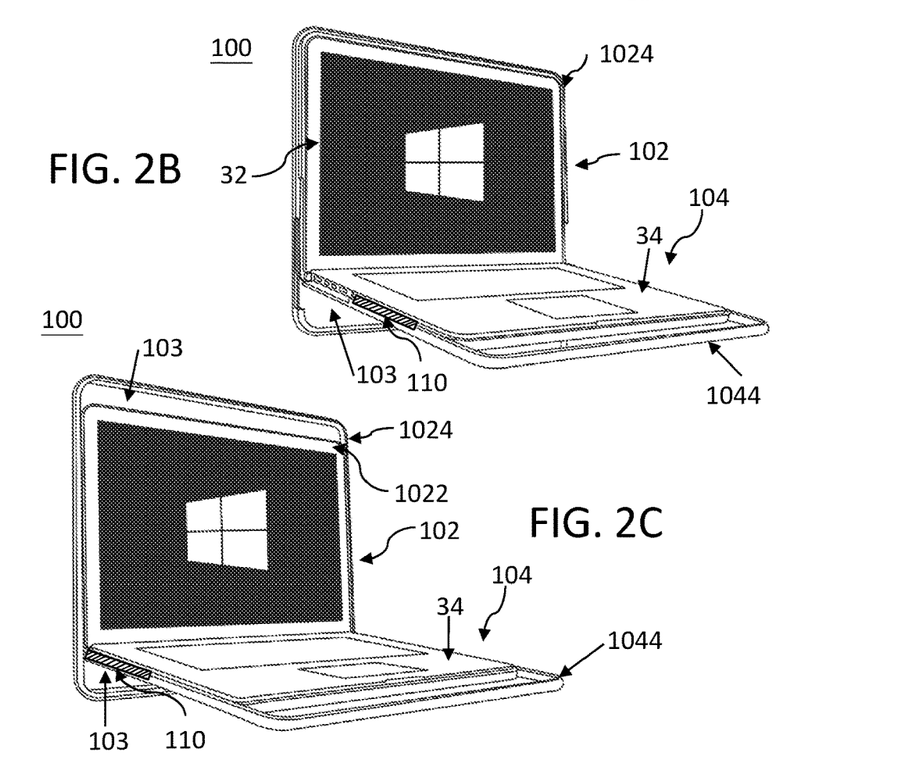
FIG. 2B illustrates a schematic view showing a mobile frame with a notebook computer in it according to other embodiment of the invention.
FIG. 2C illustrates a schematic view showing a mobile frame with a notebook computer in it according to another embodiment of the invention.

Referring to FIG. 2A-C, a mobile frame 100 is used for framing outside edges of a portable computer 30 according to an embodiment of the invention. FIG. 2A-C demonstrate an exemplarily application of a mobile frame but not to limit the scope of the present invention. The upper frame 102 and the lower frame 104 can be used for framing the outside edges of a portable electronic device. In the following paragraph, the operation of a mobile frame and its applications in portable electronic devices will be described for helping reader understand the principles of the present invention.

To further explain the structure and functions of the present invention, please referring to FIG. 1A-C and FIG. 2A-C, an upper frame 102 includes an upper inner frame 1022 and an upper outer frame 1024, a lower frame 104 includes a lower inner frame 1042 and a lower outer frame 1044, where the size of the upper inner frame 1022 is slightly lesser than that of the upper outer frame 1024, and the upper inner frame 1022 is moveably latched in the inner side of the upper outer frame 1024. Similarly, the size of the lower inner frame 1042 is slightly lesser than that of the lower outer frame 1044, and the upper inner frame 1042 is moveably latched in the inner side of the upper outer frame 1044. In one preferred embodiment, the size and shape of the upper frame 102 are the same as that of the lower frame 104 and matched with each other; the size and shape of the upper inner frame 1022 are the same as that of the lower inner frame 1042 and matched with each other; the size and shape of the upper outer frame 1024 are the same as that of the lower outer frame 1044 and matched with each other. In one preferred embodiment, both upper frame 102 and lower frame 104 are rectangular shaped with round corners, but not limit to it. In one preferred embodiment, the interior of the upper inner frame and the lower inner frame are made of plastic material, but not limit to it; the interior of the upper inner frame and the lower inner frame are hollow-out; the size of the upper inner frame 1022 and lower inner frame 1042 can be matched to the size of the portable electronic device 30; the upper inner frame 1022 and lower inner frame 1042 are made of metal, alloy or other similar materials, for example aluminum alloy. In other preferred embodiment, the upper inner frame 1022 and lower inner frame 1042 are formed by integrating molding. In case of various practical application situations, the material for making a frame 100 can be depended on the real applications, it's not limited to the plastic material, metal or alloy.

In one preferred embodiment, the upper inner frame 1022 and lower inner frame 1042 can be separately used for framing the outer edges of top cover 32 and base 34 of the portable electronic device 30. There exists a first volume 103 between the upper inner frame 1022 and upper outer frame 1024, a second volume 105 between the lower inner frame 1042 and lower outer frame 1044, where the lower inner frame 1042 can be latched inside the lower outer frame 1044 or can be integrating molding with the lower outer frame 1044 such that the second volume 105 is fixed and the first volume is adjustable, due to the relative movement between the upper inner frame 1022 and upper outer frame 1024.

Figure 3A:
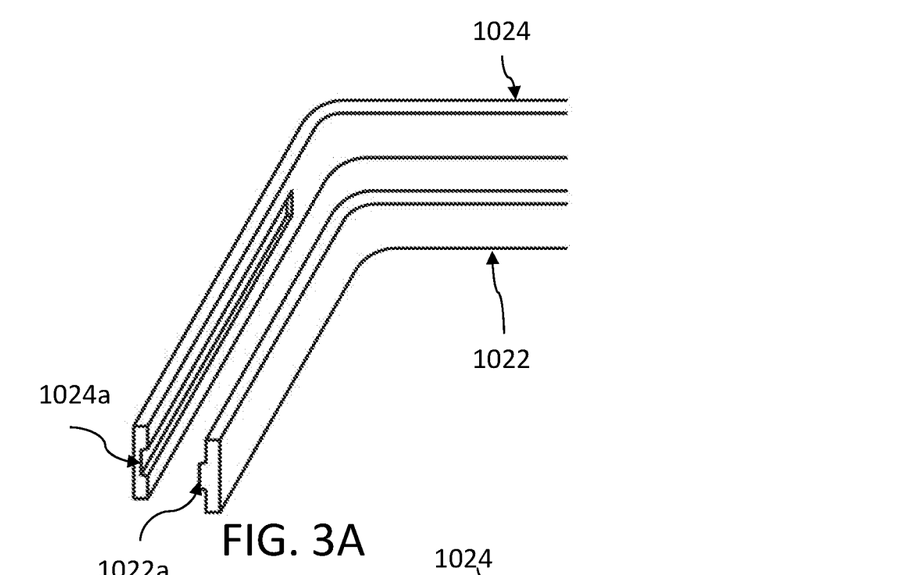
FIG. 3A illustrates a cross-sectional view showing an inner frame and an outer frame of a mobile frame according to an embodiment of the invention.
Figure 3B:
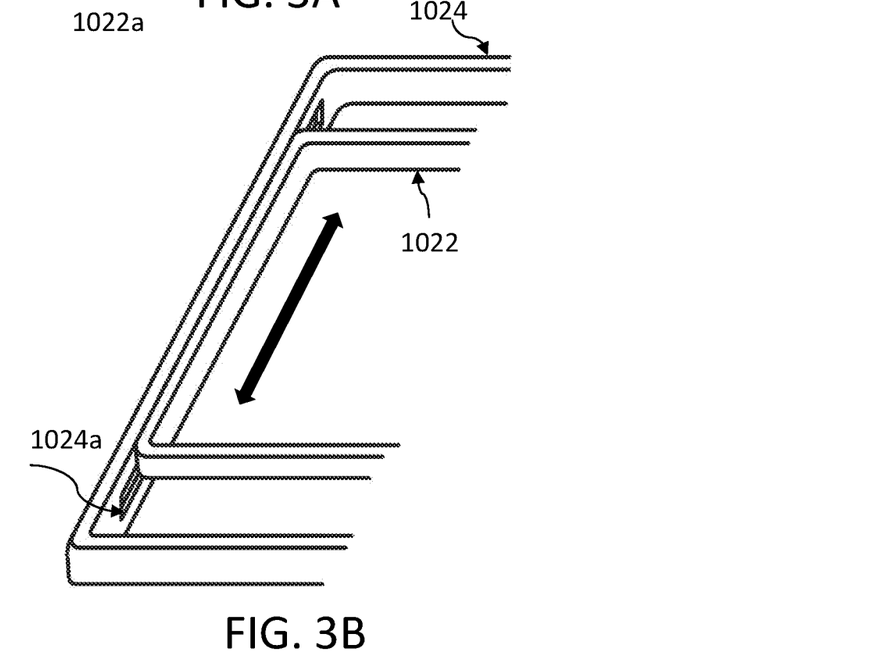
FIG. 3B illustrates a schematic view showing an inner frame can slide within an outer frame of a mobile frame according to an embodiment of the invention.

For clarifying the prospective view of the present invention, FIG. 3A and FIG. 3B only demonstrate details in some parts of the mobile frame, people who are familiar with the related art will easily understand and can analogize them. In one preferred embodiment, two outer sides (for example, left and right sides) of the upper inner frame 1022 each has a rectangular-shaped tenon 1022a, two outer sides (for example, left and right sides) of the upper outer frame 1024 each has a rectangular-shaped mortise 1024a, the rectangular-shaped tenon and mortise match with each other letting the rectangular-shaped tenon 1022a can move freely in the rectangular-shaped mortise 1024a. The upper inner frame 1022 is movably latched into the inner sides of the upper outer frame 1024, therefore, the relative position between the upper inner frame 1022 and upper outer frame 1024 can be adjusted by changing the position of the upper outer frame 1024 or the upper inner frame 1022 as indicated by the direction of the arrow in FIG. 3A-B, the size of the first volume 103 can be changed as well. The size of the first volume 103 is depended on the relative position between the upper inner frame 1022 and upper outer frame 1024. As indicated in FIG. 2A-C, the first volume 103 is illustrated in the upper part of FIG. 2A, in the lower part of FIG. 2B, and in partitioned two section of FIG. 2C.

Figure 11:
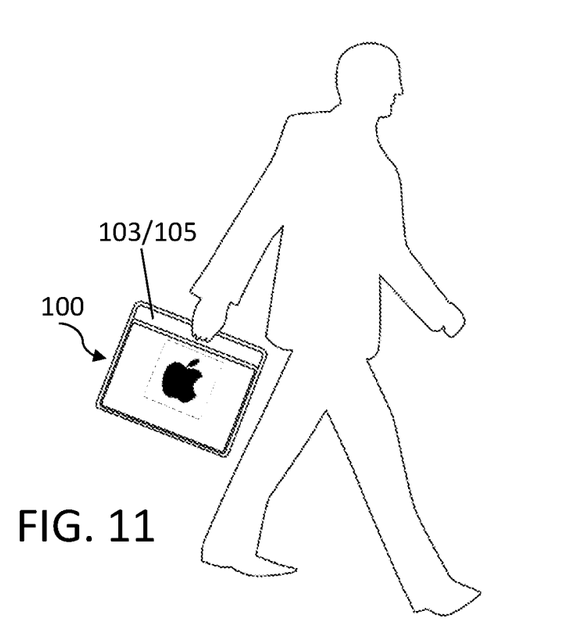
FIG. 11 illustrates a schematic view showing an exemplary application of a mobile frame according to an embodiment of the invention.
Figure 12:
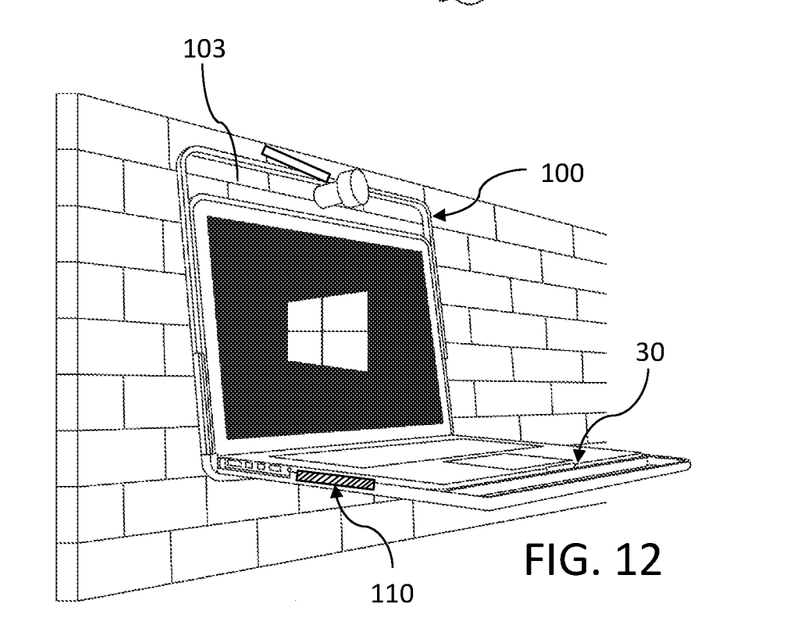
FIG. 12 illustrates a schematic view showing another exemplary application of a mobile frame according to an embodiment of the invention.

In other preferred embodiment, the two outer sides of the upper frame 1022 each has a rectangular-shaped mortise 1024a, two outer sides (for example, left and right sides) of the upper outer frame 1024 each has a rectangular-shaped tenon 1022a. The rectangular-shaped tenon and mortise match with each other letting the rectangular-shaped tenon 1022a can move freely in the rectangular-shaped mortise 1024a. In on preferred embodiment, as shown in FIG. 11 and FIG. 12, by combining the first volume 103 and the second volume 105 can transform part of the upper frame 102 and lower frame 104 and become a handle and a hanging portion of the mobile frame.

Figures 4A, 4B, 4C, 5A, 5B, 5C:
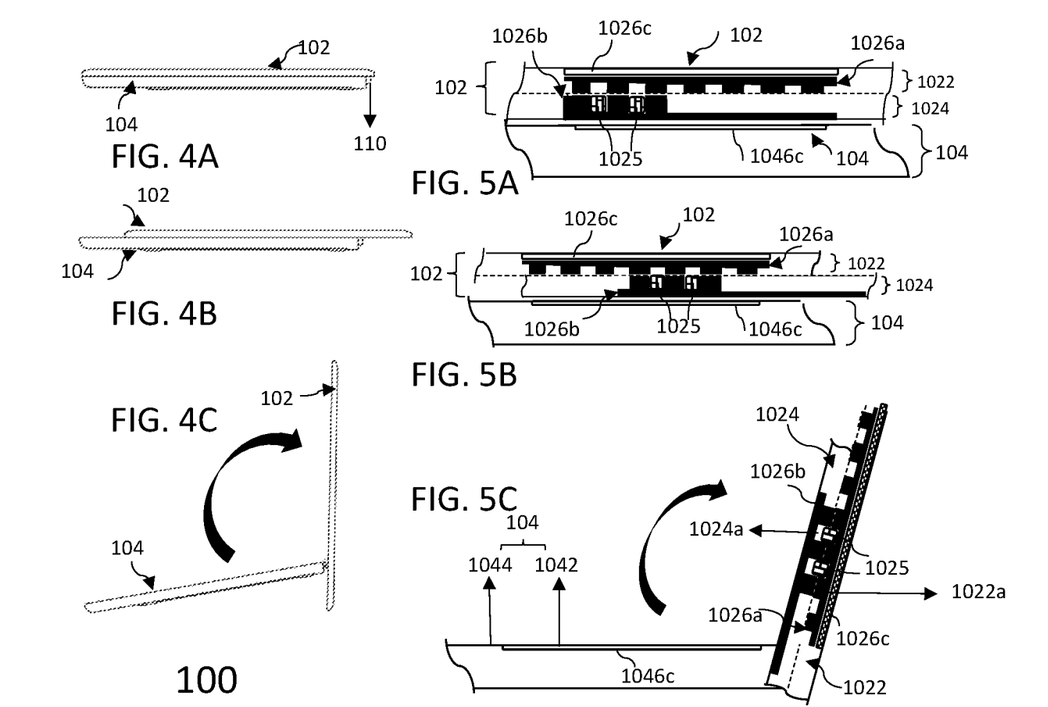
FIG. 4A illustrates a side view showing an coupled upper and a lower frames according to an embodiment of the invention.
FIG. 4B illustrates a side view showing an coupled upper and a lower frames with relative movement according to an embodiment of the invention.
FIG. 4C illustrates a side view showing an coupled upper and a lower frames with relative rotation according to an embodiment of the invention.
FIG. 5A illustrates a cross-sectional view showing FIG. 4A according to an embodiment of the invention.
FIG. 5B illustrates a cross-sectional view showing FIG. 4B according to an embodiment of the invention.
FIG. 5C illustrates a cross-sectional view showing FIG. 4C according to an embodiment of the invention.

In one preferred embodiment, referring in FIG. 5A-C, the upper frame includes a first coupling portion 1026, which contains a first magnetic coupling device 1026c; the lower frame includes a second coupling portion 1046, which contains a second magnetic coupling device 1046c. The magnetic force of the second magnetic coupling device 1046c is greater than that of the first magnetic coupling device 1026c. In one preferred embodiment, a portion of the first equal spaced continuous slot 1026a of the rectangular-shaped tenon 1022a is located in outer side of the upper inner frame 1022, a portion of the second equal spaced continuous slot 1026b of the rectangular-shaped mortise 1024a is located in outer side of the upper inner frame 1024, when the rectangular-shaped tenon 1022a is coupled to the rectangular-shaped mortise 1024a, the first continuous slot 1026a and the second continuous slot 1026b with slots are coupled face to face, a plurality of magnetic elements 1025 can be placed inside the first equal spaced continuous slot module 1026a or the second equal spaced continuous slot module 1026b and can move between them, which can produce magnetic attraction force between the upper frame 102 and the lower frame 104 and couple them together into a frame 100. In one preferred embodiment, the first equal spaced continuous slot module 1026a and the second equal spaced continuous slot module 1026b have the slots with equal sized rectangular cross-section, each of the magnetic elements 1025 has a size slightly smaller than that of the slot of first and the second continuous slot module (1026a; 1026b), thus the first and the second continuous slot module (1026a; 1026b) can accommodate the plurality of magnetic elements 1025 in them, as indicated in FIG. 5A-C. The size of rectangular shaped slots should match the size of the magnetic elements 1025, but the shape of the slots are not limited to rectangular. In one preferred embodiment, the depth of the first continuous slot module 1026a is smaller than that of the second continuous slot module 1026b, as shown in FIG. 5A-C. Magnetic attraction between the plurality of magnetic elements 1025 and the first magnetic coupling device 1026c is configured to be smaller than that between the plurality of magnetic elements 1025 and the second magnetic coupling device 1046c such that the plurality of magnetic elements 1025 can change positions by the relative motion between the first and second magnetic coupling device (1026c; 1046c).

In the previous description, the meaning of "Magnetic attraction between the plurality of magnetic elements 1025 and the first magnetic coupling device 1026c is smaller than that between the plurality of magnetic elements 1025 and the second magnetic coupling device 1046c" is equivalent to "Magnetic repulsion between the plurality of magnetic elements 1025 and the first magnetic coupling device 1026c is larger than that between the plurality of magnetic elements 1025 and the second magnetic coupling device 1046c". In other words, utilizing the fact that the coupling between the plurality magnetic elements 1025 and the first magnetic coupling device 1026c is different from the coupling between the plurality of magnetic elements 1025 and the second magnetic coupling device 1046c, resulting that the magnetic elements can move between the first and second magnetic coupling device (1026c; 1046c). In one preferred embodiment, the second magnetic coupling device 1046c and the plurality magnetic elements 1025 can be a magnet, the first magnetic coupling device 1026c can be an iron metal sheet, but not limited to them.

Figure 13:
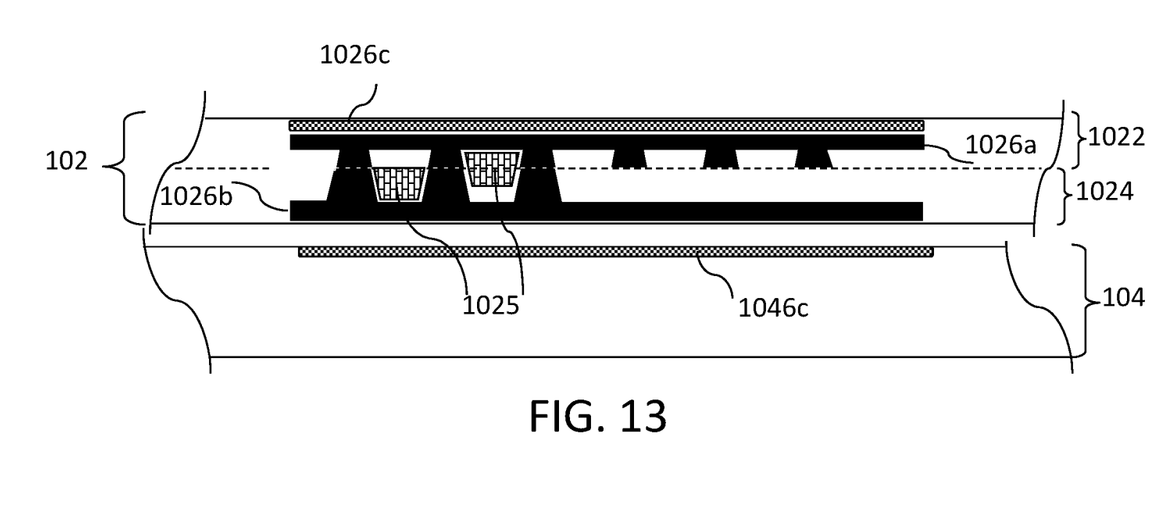
FIG. 13 illustrates another schematic view of the first and the second engagement parts according to an embodiment of the invention.

FIG. 13 illustrates another schematic view of the first and the second engagement parts according to an embodiment of the invention. In another embodiment, slots of the first and the second continuous slot (1026a; 1026b) can be trapezoid-shaped, each of the magnetic elements 1025 should have the matched trapezoid shape letting the plurality of magnetic elements 1025 can be accommodated in them.

FIG. 4A-C and FIG. 5A-C, FIG. 4A illustrates a side view showing an coupled upper and a lower frames; FIG. 5A illustrates a cross-sectional view of FIG. 4A; FIG. 4B illustrates a side view showing an coupled upper and a lower frames with relative movement; FIG. 5B illustrates a cross-sectional view of FIG. 4B; FIG. 4C illustrates a side view showing an coupled upper and a lower frames with relative rotation; FIG. 5C illustrates a cross-sectional view of FIG. 4C. For the person skilled in the arts can realize the main prospect of the invention, FIG. 5A-C only illustrates the structure of the first and second coupling portion and neglects the rest, however the upper inner frame 1022 and the upper outer frame 1024 should be latched together. In figures, the relative position between the upper inner frame 1022 and the upper outer frame 1024 is only used for indicating the relative position between the first continuous slot module 1026a and the second continuous slot module 1026b. The first magnetic coupling device 1026c is attached to one side of the first continuous slot module 1026a far from the second continuous slot module 1026b; the first continuous slot module 1026a and the second continuous slot module 1026b with slots are coupled face to face. When the upper frame 102 is parallel to the lower frame 104 (as shown in FIG. 4), because the magnetic attraction between the second magnetic coupling device 1046c of the lower frame 104 and the plurality of magnetic elements 1025 is larger than that between the first magnetic coupling device 1026c of the upper frame 102 and the plurality of magnetic elements 1025, therefore, in the coupled state, the plurality of magnetic elements 1025 is attracted by the second magnetic coupling device 1046c and fixed in the second continuous slot module 1026b of the upper outer frame 1024, as shown in FIG. 5A. Referring to FIG. 4B and FIG. 5B, the horizontal moving upper outer frame 1024 can only change the relative position between the first and the second continuous slot module (1026a; 1026b), at this moment, the magnetic elements is still attracted by the second continuous slot module 1026b of the lower frame 104 and fixed inside second continuous slot module 1026b. Referring in FIG. 4C and FIG. 5C, when the upper outer frame 1024 moves to a specified position, a force has been acted on (indicated by the arrow) the upper outer frame 1024 separating the upper frame 102 and lower frame 104, which opens an angle between the upper frame 102 and lower frame 104. At this moment, the plurality of magnetic elements 1025 being disengaged from the second magnetic coupling device 1046c and being attracted by the first magnetic coupling device 1026c, and then being fixed inside the first continuous slot module 1026a of the upper inner frame 1022. Because the depth of the slots in the first continuous slot module 1026a is smaller than that in the second continuous slot 1026b, when the situation illustrated in FIG. 5C happened, a portion of each magnetic element 1025 is fixed inside the first continuous slot module 1026a, the rest part of each magnetic element 1025 is fixed inside the second continuous slot module 1026b, hence the upper inner frame 1022 and the upper outer frame 1024 have kept stationary. In summary, according to the relative motion between the upper frame 102 and the lower frame 104, the plurality of magnetic elements 1025 can move between the slots of the first continuous slot module 1026a of the upper inner frame 1022 and the second continuous slot module 1026b of the upper outer frame 1024 such that the upper frame 1024 can slide in outer sides of the upper inner frame 1022, and can be fixed in a specified position.

Figure 6A:
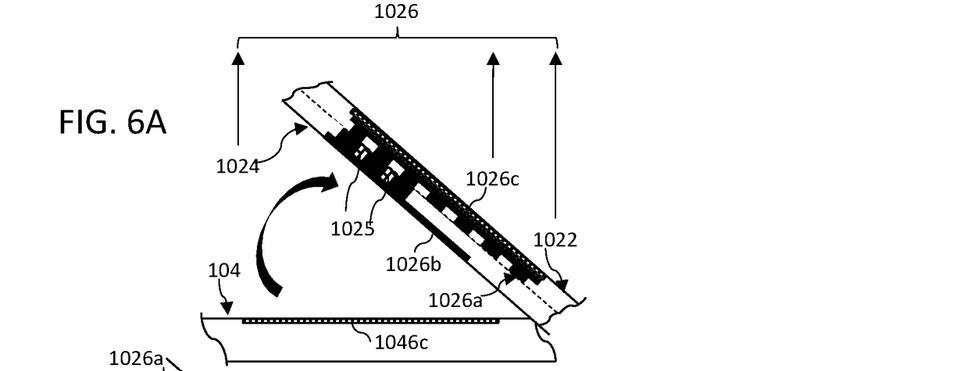
FIG. 6A illustrates a side view showing an coupled upper and a lower frames with relative rotation according to one embodiment of the invention.
Figures 6B, 6C:
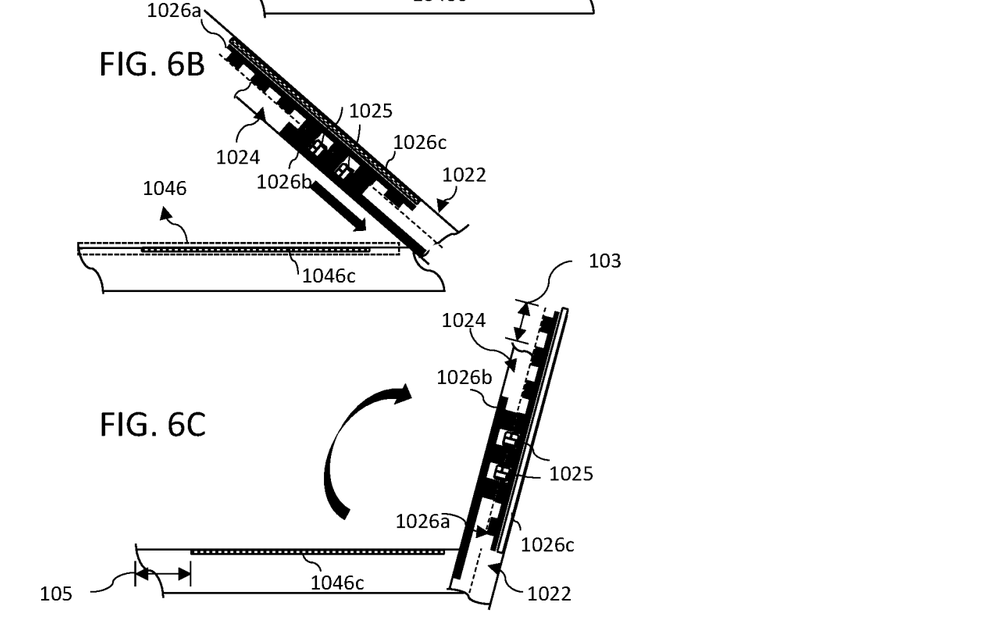
FIG. 6B illustrates a side view showing an coupled upper and a lower frames with relative rotation according to other embodiment of the invention.
FIG. 6C illustrates a side view showing an coupled upper and a lower frames with relative rotation according to another embodiment of the invention.

In other preferred embodiment, as shown in FIG. 6A-C, which illustrates a schematic view showing the steps of the relative rotation between the upper frame 102 and lower frame 104. As shown in FIG. 6A, a force (indicate by an arrow) has been acted on the mobile frame and opens an angle between the upper frame 102 and lower frame 104; in FIG. 6B, the upper outer frame 1024 has been pushed (indicated by the arrow) making the first continuous slot module 1026a and the second continuous slot module 1026b with relative movement, i.e. the second continuous slot module 1026b will move toward the direction of the arrow indicated in FIG. 6B; in FIG. 6C, a force has been acted on the upper frame 102 and let the first coupling portion 1026 moving further away from the second coupling portion 1046, the magnetic attraction between the second magnetic coupling device 1026c and the plurality of magnetic elements 1025 is larger than that between the first magnetic coupling device 1046c and the plurality of magnetic elements 1025, therefore, the plurality of magnetic elements 1025 can move into the slots of first continuous slot module 1026a from the second continuous slot module 1026b. Because the depth of the slots in the first continuous slot module 1026a is smaller than that in the second continuous slot module 1026b, when the situation illustrated in FIG. 6C happened, a portion of each magnetic element 1025 is fixed inside the first continuous slot module 1026a, the rest part of each magnetic element 1025 is fixed inside the second continuous slot module 1026b, hence the upper inner frame 1022 and the upper outer frame 1024 can keep stationary.

Figure 7:
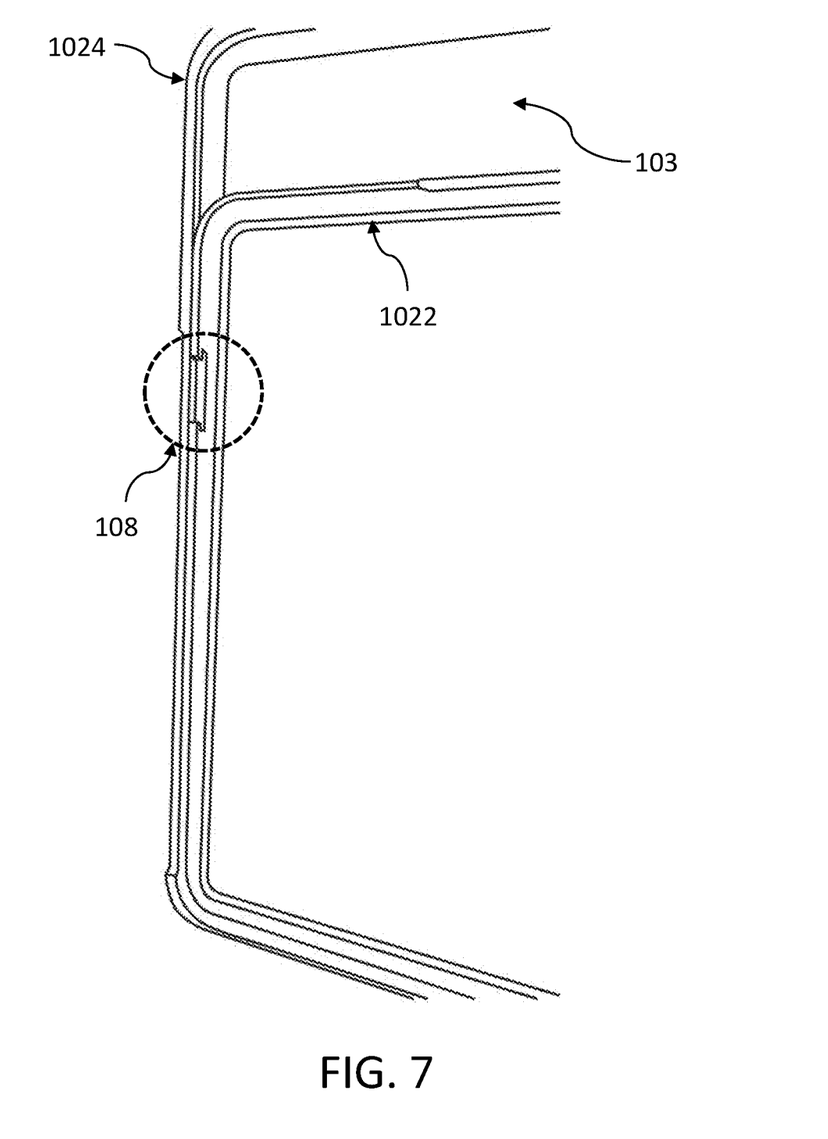
FIG. 7 illustrates a schematic view showing latched upper inner and upper outer frames according to an embodiment of the invention.
Figure 8A:
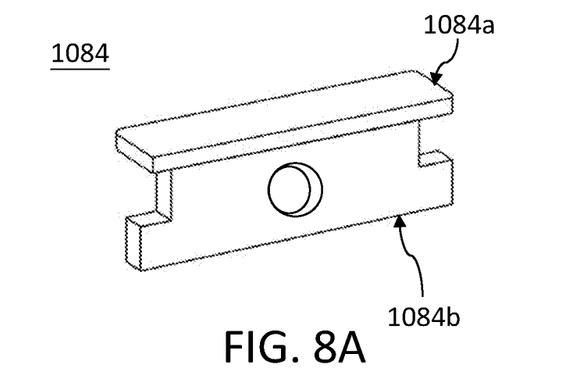
FIG. 8A illustrates a prospective view of a bayonet lock according to an embodiment of the invention.
Figure 8B:
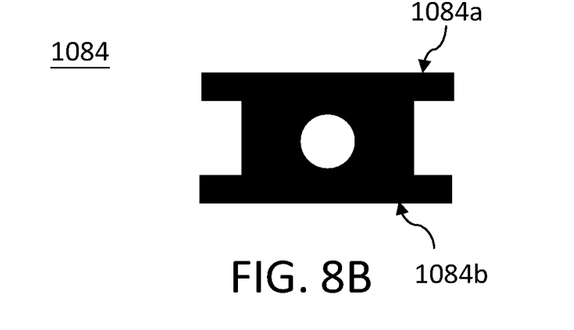
FIG. 8B illustrates a front view of a bayonet lock according to an embodiment of the invention.
Figure 8C:
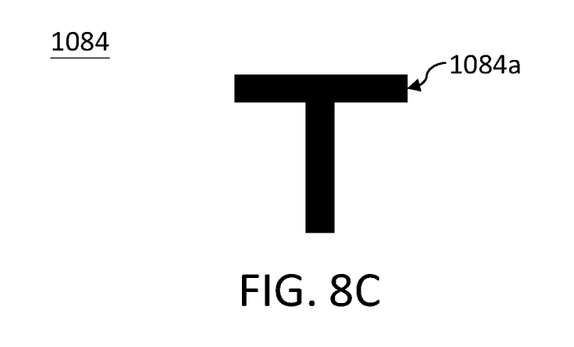
FIG. 8C illustrates a cross-sectional view of a bayonet lock according to an embodiment of the invention.

In one preferred embodiment, the upper inner frame 1022 and the lower inner frame 1042 has at least a pair of latched parts 108 each, their purpose is to fix the portable electronic device 30 inside the space between the upper inner frame 1022 and the lower inner frame 1042 and prevent the portable electronic device 30 separating from them. FIG. 7 illustrates a schematic view showing latched upper inner and upper outer frames.

Figure 9A:
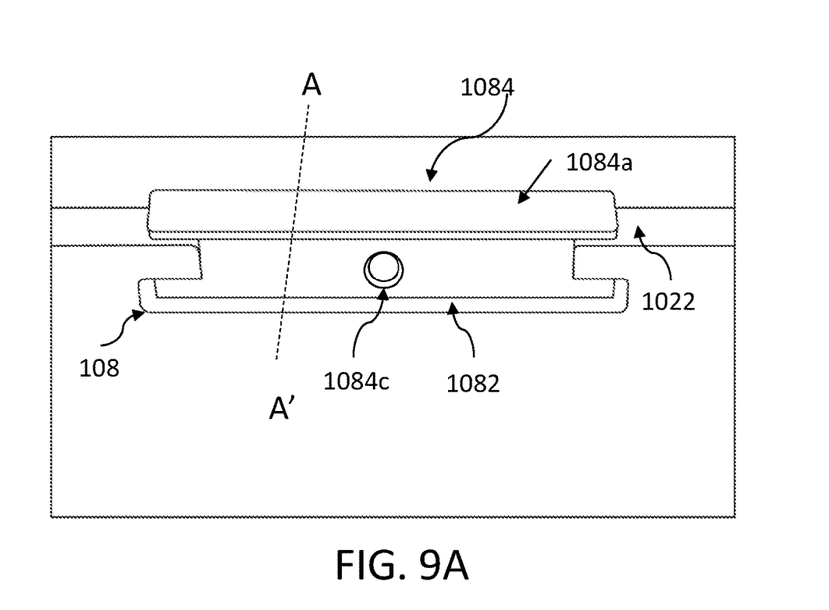
FIG. 9A illustrates a schematic view of an engagement part according to an embodiment of the invention.
Figure 9B:
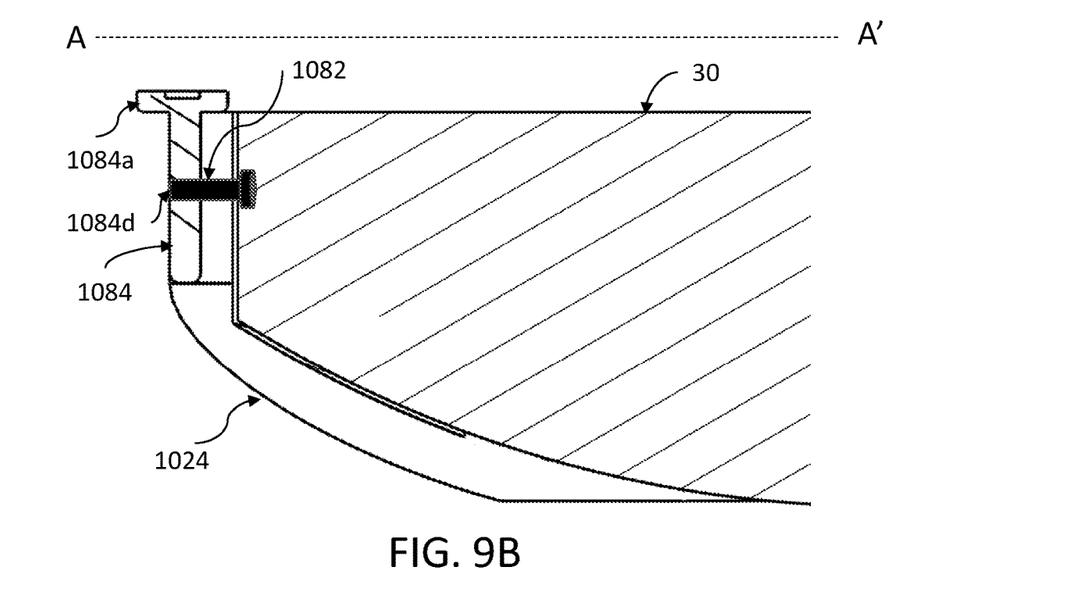
FIG. 9B illustrates a cross-sectional view showing the FIG. 9A according to an embodiment of the invention.
Figure 10A:
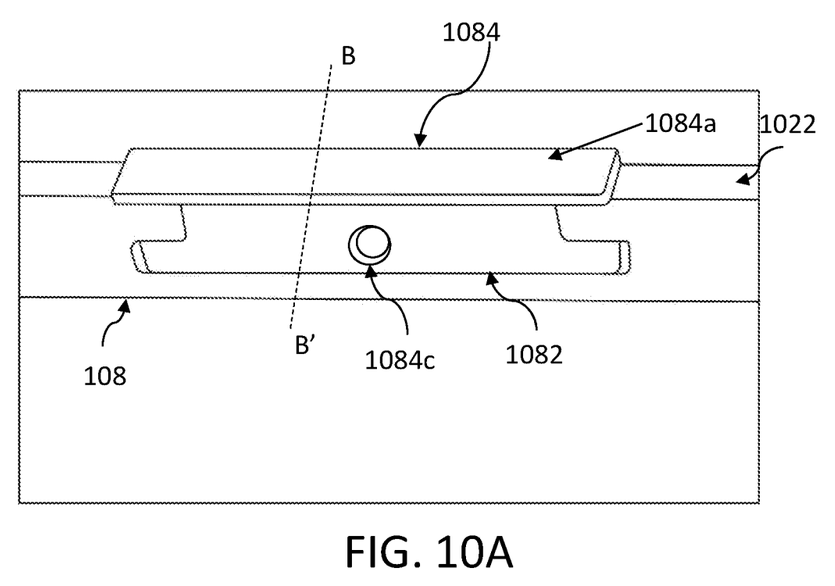
FIG. 10A illustrates another schematic view of an engagement part according to an embodiment of the invention.
Figure 10B:
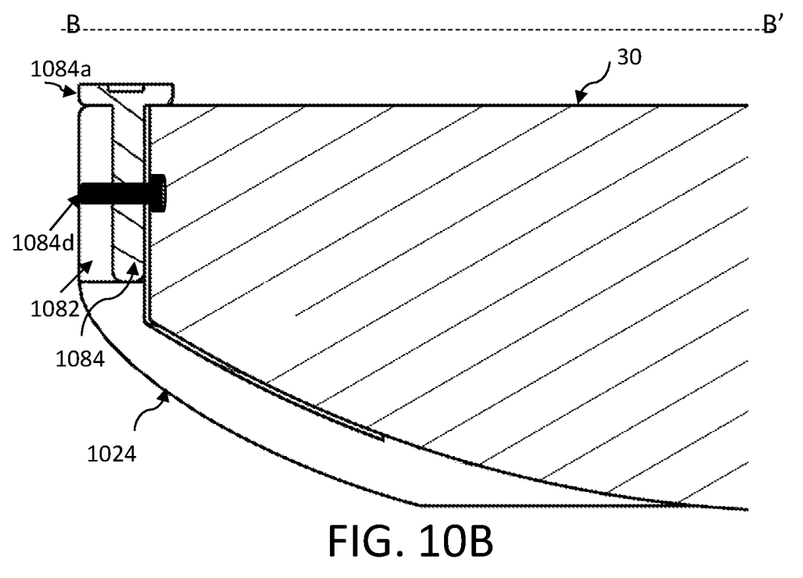
FIG. 10B illustrates a cross-sectional view showing the FIG. 10A according to an embodiment of the invention.

In one preferred embodiment, referring to FIG. 7-FIG. 10B, the latched parts 108 include a slot 1082 for accommodating a bayonet lock 1084. In one preferred embodiment, the top face of the bayonet lock 1084 is a stop face 1084a, which is perpendicular to the end face 1084b, as shown in FIG. 8A; the stop face 1084a is parallel and coupled to the top surface of the upper frame 1022, i.e. the front view of the bayonet lock 1084 is I-shaped, as shown in FIG. 8B; the cross-sectional view of the bayonet lock 1084 is T-shaped, as shown in FIG. 8C. The thickness of some parts of the bayonet lock 1084 is smaller than that of the upper inner frame 1022, but the thickness of the top face 1084a is larger than that of the upper inner frame 1022 such that the bayonet 1084 can move inside the slot 1082 without been disengaged. For example, referring in FIG. 9A, FIG. 9B, FIG. 10A, and FIG. 10B, FIG. 9B is a cross-sectional view along line A-A', FIG. 10B is a cross-sectional view along line B-B; FIG. 9A and FIG. 9B illustrate that the bayonet lock 1084 is closer to the upper outer frame 1024 and leave a space in the slot 1082, FIG. 10A and FIG. 10B illustrate that the bayonet lock 1084 is away from the upper outer frame 1024. When inner frame 102 is placed in the outside edges of the portable electronic device 30, the bayonet lock 1084 is moved to be able to attach the outside edges of the portable electronic device 30, as shown in FIG. 10B, therefore, while opening the portable electronic device 30, the stop face 1084a of the bayonet lock 1084 can provide a stop to the outside edges of the portable electronic device and prevent it disengaging from the upper and lower inner frame (1022; 1042).

Referring to FIG. 9A-10B again, in one preferred embodiment, the bayonet lock 1084 further includes a through hole 1084c passing through it with a positioning device 1084d and being fixed into the upper outer frame 1024. It is noticed that the length of the positioning device 1084d should be larger than the thickness of the upper inner frame 1022 such that the end of the positioning device 1084d can be fixed into the upper outer frame 1024, as shown in FIG. 9B and FIG. 10B. The bayonet lock 1084 can move in the direction parallel to the length direction and it will not disengaged from the slot 1082. The latched parts 108 in the present invention have the following purposes, first, the bayonet lock 1084 can move in the slot 1082 with constrain, and second, the bayonet 1084 can provide a lock force. The above description is only an exemplary showing that the bayonet lock 1084 of the latched part 108 can provide a stopped force, the bayonet lock 1084 can also be set in the slot 1082 by other embodiments and not limited by the previous mentioned exemplary.

In one preferred embodiment, one portion of the of lower outer frame 1044 can have a sliding dust-proof component 110, which corresponds to the connection port of the portable electronic device 30, as shown in FIG. 2A-C and FIG. 12. The sliding dust-proof component 110 can provide protection to the connection port preventing dust or moisture from outside world and can prolong the life time of the portable electronic device 30. In addition, the sliding dust-proof component 110 can slide and move away from the connection port when needed without taking the frame 100 apart. The sliding dust-proof component 110 has been disclosed in Taiwan patent TW 201145326, as will be understood by persons skilled in the art, by gliding a sliding block (not shown) of the sliding dust-proof component 110 in the low outer frame 1044, the sliding dust-proof component 110 can glide in the outsides of the lower outer frame 1044.

In one preferred embodiment, the upper frame 102 and the lower frame 104 further include protection covers (not shown). The protection covers can be latched into the interior of the upper inner frame 1022 and the lower inner frame 1042 such that the interior of the frame 100 is not hollow-out for protecting the top and back surfaces of the portable electronic devices 30. The protection covers are detachable, which can protect the surfaces of the portable electronic devices from being scratched. The material of the protection cover can be transparent plastic, aluminum, or other light weight water-proof materials.

The present invention has the features and advantages:

(1) the mobile frame provides not just a protection frame, it also offer multiple effects through simple operation, which coordinates the interaction between the first continuous slot 1026a of the upper inner frame 1022 and the second continuous slot 1026b of the upper outer frame 1024, latched component 108 of the inner frame 102 and its corresponding bayonet lock 1084, and the coupling between the first coupling portion 1026 and the second coupling portion 1046.

(2) the mobile frame offers additional functions such as being a handle, an adjustable supporter, or a hanging portion by combining a portion of the upper outer frame and lower outer frame (1024; 1044).

Various terms used in this disclosure should be construed broadly. For example, if an element "A" is to be coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A mobile frame comprising:
   an upper frame including an upper outer frame and an upper inner frame, the upper inner frame being latched into the upper outer frame, the upper frame having a first coupling portion including:
      a first continuous slot module, locating in the upper inner frame;
      a second continuous slot module, locating in the upper outer frame; and
      a first magnetic coupling device;
   a lower frame including a lower outer frame and a lower inner frame, the lower frame having a second coupling portion including a second magnetic coupling device; and
   a plurality of magnetic elements being placed between the first and the second continuous slot modules, wherein the magnetic coupling between the second magnetic coupling device and the plurality of magnetic elements is larger than the magnetic coupling between the first magnetic coupling device and the plurality of magnetic elements;
   wherein the upper frame is rotatable relative to the lower frame.

2. The mobile frame of claim 1, wherein the inner side of the upper outer frame has a mortise, the outer side of the upper outer frame has a tenon matching to the mortise.

3. The mobile frame of claim 1, wherein a first volume locates between the upper inner frame and the upper outer frame, a second volume locates between the lower inner frame and the lower outer frame, the first volume corresponds to the second volume.

4. The mobile frame of claim 1, wherein the lower outer frame has a sliding dust-proof component, each of the upper inner frame and the lower inner frame can be latched with a protecting cover, respectively.

5. The mobile frame of claim 4, wherein the sliding dust-proof component can glide in the outsides of the lower outer frame.

6. The mobile frame of claim 1, wherein the first magnetic coupling device is an iron metal sheet.

7. The mobile frame of claim 1, wherein the second magnetic coupling device is an iron metal sheet.

8. The mobile frame of claim 1, wherein the plurality of magnetic elements are magnets.

9. The mobile frame of claim 3, according to the relative movement between the upper inner frame and the upper outer frame, the first volume having:
   a first state, wherein the first volume and the second volume overlap to form a handle; and
   a second state, wherein the first volume and the second volume locate in opposite side respectively to form a support.

* * * * *